US011685396B2

(12) United States Patent
Mujica et al.

(10) Patent No.: US 11,685,396 B2
(45) Date of Patent: Jun. 27, 2023

(54) ARCHITECTURE FOR AUTOMATION AND FAIL OPERATIONAL AUTOMATION

(71) Applicant: Apple Inc., Cupertino, CA (US)

(72) Inventors: Fernando A. Mujica, Los Altos, CA (US); Mark P. Colosky, Sunnyvale, CA (US); Paul A. Baker, Los Altos, CA (US); Joyce Y. Kwong, Sunnyvale, CA (US); Leland W. Lew, Los Altos, CA (US)

(*) Notice: Subject to any disclaimer, the term of this patent is extended or adjusted under 35 U.S.C. 154(b) by 46 days.

(21) Appl. No.: 16/959,177

(22) PCT Filed: Jan. 11, 2019

(86) PCT No.: PCT/US2019/013186
§ 371 (c)(1),
(2) Date: Jun. 30, 2020

(87) PCT Pub. No.: WO2019/140185
PCT Pub. Date: Jul. 18, 2019

(65) Prior Publication Data
US 2021/0362740 A1    Nov. 25, 2021

Related U.S. Application Data

(60) Provisional application No. 62/616,068, filed on Jan. 11, 2018.

(51) Int. Cl.
*B60W 60/00* (2020.01)
*G01C 21/34* (2006.01)
(Continued)

(52) U.S. Cl.
CPC ....... *B60W 60/001* (2020.02); *G01C 21/3407* (2013.01); *G01C 21/3602* (2013.01);
(Continued)

(58) Field of Classification Search
CPC ........... B60W 60/001; B60W 2420/42; B60W 2420/52; G01C 21/3407; G01C 21/3602;
(Continued)

(56) References Cited

U.S. PATENT DOCUMENTS 7,477,285 B1    1/2009  Johnson
8,885,151 B1   11/2014  Chatham
(Continued)

FOREIGN PATENT DOCUMENTS

CN    105723747 A    6/2016
CN    106101590 A   11/2016
(Continued)

OTHER PUBLICATIONS

Communication, Examination Report, European Patent Application No. 19704088.4, dated Jul. 9, 2021, 5 pages.
(Continued)

*Primary Examiner* — Thomas Ingram
(74) *Attorney, Agent, or Firm* — Kowert, Hood, Munyon, Rankin & Goetzel, P.C.

(57) ABSTRACT

In an embodiment, an automation system for a vehicle may employ a variety of diversities to enhance reliability, accuracy, and stability in automating operation of the vehicle. For example, in an embodiment, an automation system for a vehicle may include multiple sensor pods with overlapping fields of view. Each sensor pod may include multiple different sensors in an embodiment, providing diverse views of the environment surrounding the vehicle. A set of sensor pods with overlapping fields of view may also transmit their object data at different points in time, providing diversity in time. Redundancy in other areas, such as the network switches which connect the sensor pods to an automation controller, may also aid in provided fail operational functionality. In an embodiment, the sensor pods may include
(Continued)

local processing to process the data captured by the sensors into object identification.

21 Claims, 9 Drawing Sheets (51) Int. Cl.
*G01C 21/36* (2006.01)
*G01S 13/66* (2006.01)
*G01S 13/86* (2006.01)
*G01S 13/931* (2020.01)

(52) U.S. Cl.
CPC ............ *G01S 13/66* (2013.01); *G01S 13/865* (2013.01); *G01S 13/867* (2013.01); *G01S 13/931* (2013.01); *B60W 2420/42* (2013.01); *B60W 2420/52* (2013.01)

(58) Field of Classification Search
CPC ...... G01S 13/66; G01S 13/865; G01S 13/867; G01S 13/931; G01S 13/96; G01S 13/726
See application file for complete search history.

(56) References Cited

U.S. PATENT DOCUMENTS

| | | | |
|---|---|---|---|
| 2006/0072014 A1 | 4/2006 | Geng | |
| 2007/0219720 A1 | 9/2007 | Trepagnier | |
| 2008/0009965 A1 | 1/2008 | Bruemmer | |
| 2008/0150787 A1* | 6/2008 | Cummings | G01S 7/003 342/59 |
| 2011/0184605 A1 | 7/2011 | Neff | |
| 2012/0221168 A1* | 8/2012 | Zeng | B60W 30/16 701/1 |
| 2014/0140576 A1* | 5/2014 | Ikeda | G06V 20/52 382/103 |
| 2014/0195138 A1 | 7/2014 | Stelzig | |
| 2015/0160613 A1 | 6/2015 | Ferraro | |
| 2017/0060574 A1 | 3/2017 | Malladi | |
| 2018/0067489 A1* | 3/2018 | Oder | G05D 1/0231 |
| 2018/0067492 A1* | 3/2018 | Oder | G05D 1/0246 |
| 2019/0197339 A1* | 6/2019 | Han | H04N 21/4424 |
| 2022/0074056 A1* | 3/2022 | Nalladega | G01M 99/002 |

FOREIGN PATENT DOCUMENTS

| | | |
|---|---|---|
| CN | 106871915 A | 6/2017 |
| CN | 106908783 A | 6/2017 |
| CN | 107077780 A | 8/2017 |
| CN | 206493897 U | 9/2017 |
| GB | 2297008 | 7/1996 |
| GB | 2555923 A | 5/2018 |
| JP | 2017074887 A | 4/2017 |
| RU | 2479015 C1 | 4/2013 |
| WO | 03093857 A2 | 11/2003 |
| WO | 2015082293 A1 | 6/2015 |
| WO | 2016059122 A1 | 4/2016 |
| WO | 2017064944 A1 | 4/2017 |
| WO | 2017210222 A1 | 12/2017 |

OTHER PUBLICATIONS

IPRP, PCT/US2019/013186, 9 pages, dated Jul. 23, 2020.
Thrun et al; Stanley: The Robot that Won the DARPA Grand Challenge; Journal of Field Robotics 23(9), 661-692 (2006) Wiley Periodicals, Inc. www.intersicence.wiley.com; 32 pages.
ISRWO, PCT/US2019/013186, 15 pages, dated May 9, 2019.
U.S. Appl. No. 17/932,177, filed Sep. 14, 2022.
Mujica; "Scalable Electronics Driving Autonomous Vehicle Techonologies", Texas Instruments, Apr. 2014, 9 pages.
Jiaoyu Xing, Research on forward vehicle detection and recognition technology based on intelligent pure electric vehicles, China Excellent Masters Thesis Full-text Database Engineering Science and Technology II, Jul. 15, 2017.
Office Action in EP Appl. No. 19704088.4 dated Nov. 3, 2022, 7 pages.

* cited by examiner

Fig. 12 ically set 10 vehicle with another embodiment of an automation system.
ARCHITECTURE FOR AUTOMATION AND FAIL OPERATIONAL AUTOMATION This application is a 371 of PCT Application No. PCT/US2019/013186, filed Jan. 11, 2019, which claims benefit of priority to U.S. Provisional Patent Application Ser. No. 62/616,068, filed on Jan. 11, 2018. The above applications are incorporated herein by reference. To the extent that any material in the incorporated application conflicts with material expressly set forth herein, the material expressly set forth herein controls.

BACKGROUND

Technical Field

Embodiments described herein are related to vehicle automation.

Description of the Related Art

Advances in vehicle automation are proceeding at a rapid pace as more companies become involved in development of automation solutions. Generally, vehicle automation can require highly accurate sensing of the environment in which the vehicle is operating (e.g. the road course, other vehicles, stationary objects, obstructions in the roadway, etc.). The control mechanisms for the vehicle are also required to be highly accurate and resistant to failure when components within the vehicle fail, retaining control of the vehicle and continuing safe operation or bringing the vehicle safely to a stop. These challenges also need to be addressed with an economical and efficient system that can be mass-produced.

SUMMARY

In an embodiment, an automation system for a vehicle may employ a variety of diversities to enhance reliability, accuracy, and stability in automating operation of the vehicle. For example, in an embodiment, an automation system for a vehicle may include multiple sensor pods with overlapping fields of view. Each sensor pod may include multiple different sensors in an embodiment, providing diverse views of the environment surrounding the vehicle. The overlapping fields of view may help in the event of a failure of a sensor pod, since the area monitored by the failed sensor pod is at least partially covered by a still-functioning sensor pod. The overlapping fields of view may also provide multiple views of an object in the environment, which may permit validation of various sensor pods and/or the discard of data from a sensor pod that does not agree with the others, in an embodiment. A set of sensor pods with overlapping fields of view may also transmit their object data at different points in time, providing diversity in time. Redundancy in other areas, such as the network switches which connect the sensor pods to an automation controller, may also aid in provided fail operational functionality. In some embodiments, multiple sensor processing algorithms may be used to provide diversity in the algorithmic sense as well.

In an embodiment, the sensor pods may include local processing to process the data captured by the sensors into object identification. The amount of data to be communicated between the sensor pods and the automation controller may be substantially reduced, thus reducing the bandwidth needed between the sensor pods and the automation controller. The distribution of processing between the sensor pods and the automation controller may also reduce the amount of processing power implemented in the automation controller, in an embodiment.

BRIEF DESCRIPTION OF THE DRAWINGS

The following detailed description makes reference to the accompanying drawings, which are now briefly described.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to. As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

An embodiment of an automation system described herein may implement a variety of diversities. In general, diversifying the automation system may include using multiple differences in components in the system to provide additional information about the environment in which the automated vehicle is operating and/or to provide redundancy in the system without actual, physical reproduction of the components (in at least some cases). For example, diverse components may have different weaknesses in their ability to detect certain objects or other environment parameters, and thus one component's weakness may be offset by another component's strength. These different types of components may be referred to as having diverse "modalities," since the mechanism for sensing the environment is different in the different types. Capturing environment "snapshots" in different components with overlapping fields of view at different points in time may provide diversity in time with respect to objects in the overlapping area. The sensors (or sensor pods, in one embodiment) with overlapping fields of view may be physically placed as far from each other as possible, providing diversity in space. Processing algorithms applied to different modalities in a sensor pod, or to different sensor pods, may provide algorithmic diversity. These diversities may allow components to compensate for weaknesses, or even failures, in other components and/or may allow components to self-diagnose failures in the automation system, enabling corrective action to be taken quickly in the event of such a failure.

In addition to the diversities, an embodiment of the automation system may also include redundancy in portions of the system where diversity is not present and/or where diversity may not be sufficient to provide fail operational operation. Examples of redundancy may be the connection of sensor pods having overlapping fields of view to different network switches in a central automation controller, or connection of each sensor pod to two or more of the network switches. Processors that perform processing in the sensor pods and in the automation controller may also be redundant.

In an embodiment, the sensor pods may include local processing to identify objects in the field of view covered by the sensors, transmitting the set of identified objects to the automation controller rather than the raw sensor data. The set of objects may be identified by a smaller amount of data (object data) than the raw sensor data, in an embodiment, reducing the bandwidth requirements between the sensor pods and the automation controller. Less costly connection media (e.g. twisted pair cables, in the case of an Ethernet network) may be used to connect the sensor pods and the automation controller. Additionally, processing the raw sensor data into object data in the sensor pods may improve modularity in the system, in an embodiment. For example, different types of sensors and/or improved versions of sensors may be included in a sensor pod placed in the vehicle without requiring changes to the automation controller, in an embodiment. Generally, object data may refer to data that describes objects in the field of view (e.g. the object's position, the object's distance or depth from the vehicle 10, whether the object is stationary or in motion, classification of the object, etc.).

Figure 1:
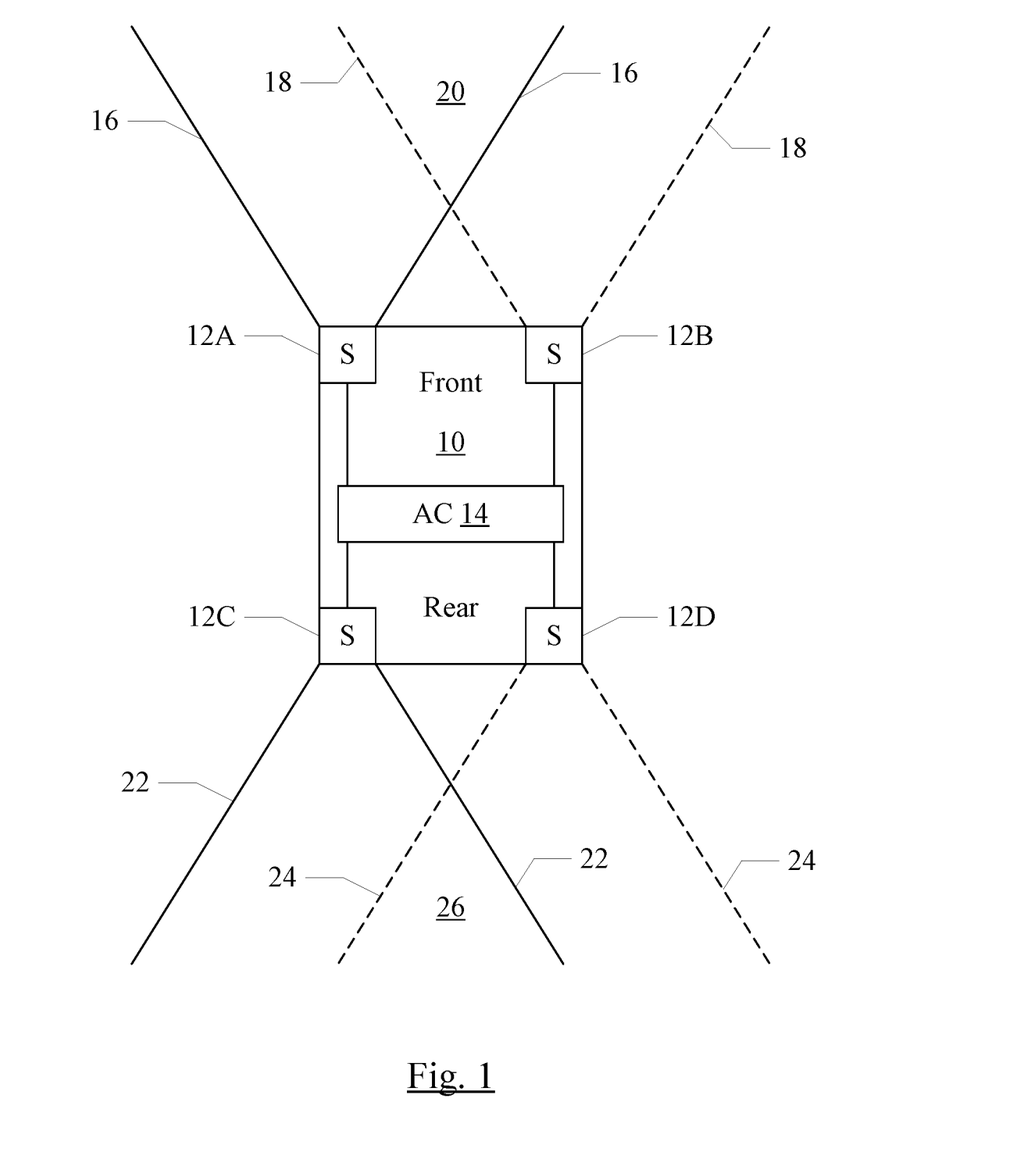
FIG. 1 is a block diagram of one embodiment of a vehicle with one embodiment of an automation system.

Turning now to FIG. 1, a block diagram of one embodiment of a vehicle 10 that includes one embodiment of an automation system is shown. As illustrated by the labels in FIG. 1, the front of the vehicle may be at the top as illustrated in FIG. 1, and the rear of the vehicle may be at the bottom of FIG. 1. The vehicle 10 may be any type of motorized transport that is legal to operate on roadways. For example, the vehicle 10 may include cars powered by internal combustion engines fueled by gasoline, diesel engines, hybrid engines, full electric engines, etc. The vehicle 10 may include pickup trucks and larger trucks that transport goods (e.g. "semis"). The vehicle 10 may include buses and other mass transportation vehicles. The vehicle 10 may include motorcycles.

The automation system may include a set of sensor pods (reference numerals 12A-12D) and an automation controller 14, in an embodiment. The sensor pods 12A-12D may be coupled to the automation controller 14 using network cables. For example, in an embodiment, the automation system may implement Ethernet networking and the network cables may be one or more twisted-pair conductors. Other embodiments may implement any networking topology and/or wireless connectivity.

The location of the sensor pods 12A-12D in FIG. 1 may represent the physical locations of the sensor pods 12A-12D on the vehicle 10, the perimeter of which is indicated by the box representing the vehicle 10. That is, the sensor pods 12A-12D may be spread in space as far as practical on the vehicle 10. For example, the sensor pods 12A-12B in the front of the vehicle 10 may be designed to mount in or near the headlight assemblies on the vehicle 10, which are typically near the front corners of the car. The sensor pods 12C-12D in the rear of the vehicle 10 may be designed to mount in or near the taillight assemblies on the vehicle 10, which are typically near the rear corners of the car. Physically placing the sensor pods as far apart as possible may provide wider range of the total field of view available to the automation system. Additionally, when objects are in the total field of view, wide placement of the sensor pods 12A-12D may provide more visibility around the object than narrower placement would provide. Thus, placement of the sensor pods 12A-12D may provide diversity in space.

Additionally, the fields of view of the sensor pods 12A-12B may overlap, as may the fields of view of the sensor pods 12C-12D. For example, the field of view for sensor pod 12A is illustrated by solid lines 16, and the field of view of the sensor pod 12B is illustrated by dashed lines 18. The area of overlap 20 is covered by both sensor pods 12A-12B. Accordingly, if one of the sensor pods 12A-12B were to fail, the other sensor pod 12A-12B would still provide visibility to objects in the area 20. The area 20 is approximately centered in front of the car, which may be an important area for visibility since objects in the area 20 may be the most difficult to avoid via a change of course. The overlap in the area 20 may also provide higher accuracy for objects in the area 20 when no sensor failure occurs, since two sets of sensors may detect the object. Similarly, the field of view of the sensor pod 12C is illustrated by the solid lines 22 and the field of view of the sensor pod 12D is illustrated by the dashed lines 24, with the overlapping area 26 approximately centered to the rear of the vehicle 10. The overlap of the fields of view may provide redundancy. If enough overlap is provided, full redundancy of the sensor pods 12A-12D themselves may not be required (e.g. full redundancy would require two or more sensor pods installed in the same location).

Failure of a sensor pod 12A-12D may be temporary or permanent. Temporary failures may include loss of power in the sensor pod 12A-12D, obscuration of the sensors in the sensor pod 12A-12D (e.g. splashing mud onto the sensor pod 12A-12D, road grime obscuring the sensor pod 12A-12D, etc.), etc. Temporary failure may be rectified to place the sensor pod 12A-12D back in service (e.g. cleaning the sensor pod 12A-12D, restoring power to the sensor pod 12A-12D, etc.). Permanent failure, on the other hand, may be rectified by replacing the sensor pod 12A-12D. Permanent failure may occur due to physical damage to the sensor pod 12A-12D (e.g. in an accident), wear out of a part in the sensor pod 12A-12D, etc.

Figure 2:
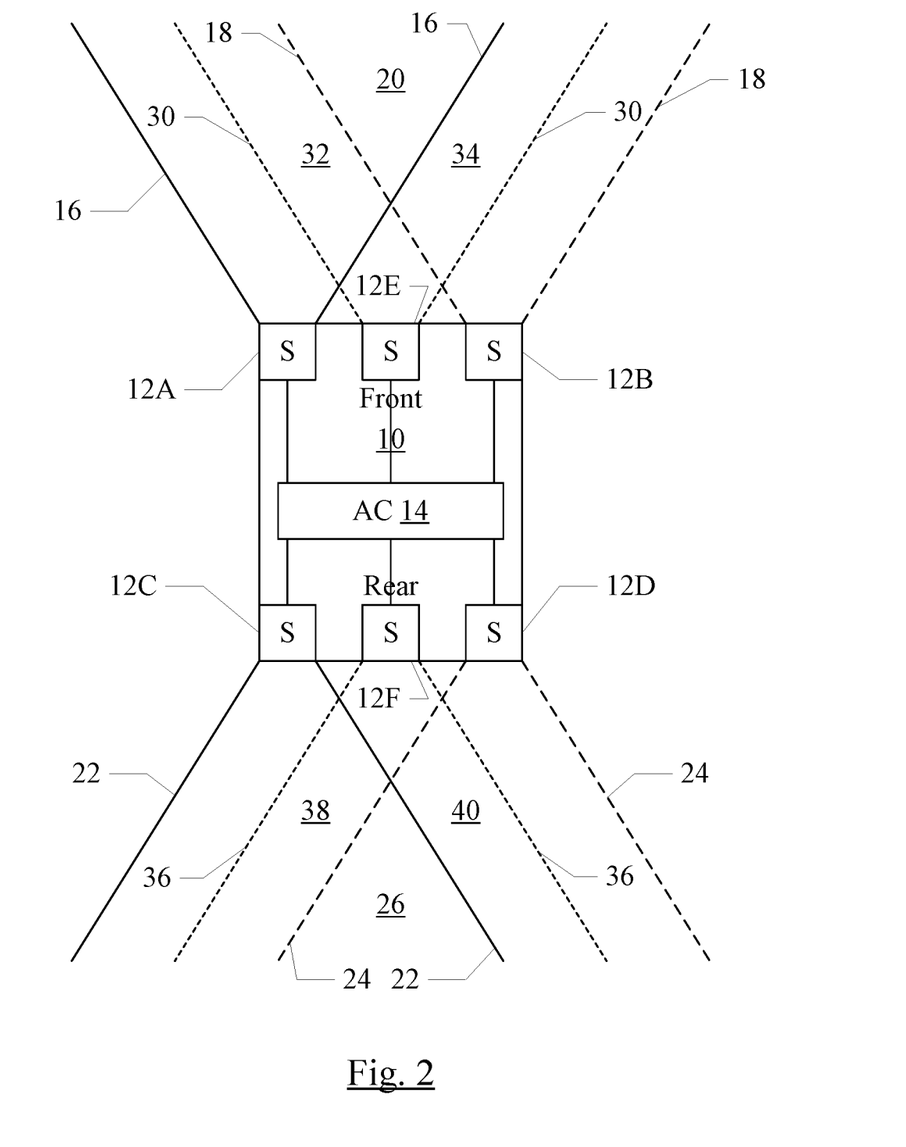
FIG. 2 is a block diagram of another embodiment of a vehicle with another embodiment of an automation system.

The number and placement of sensor pods 12A-12D may vary from embodiment to embodiment. For example, FIG. 2 is a block diagram of an embodiment of the vehicle 10 having an automation system including the sensor pods 12A-12D as well as sensor pods 12E-12F. Like the sensor pods 12A-12D, the sensor pods 12E-12F are coupled to the automation controller 14, e.g. with a network cable. The sensor pods 12E-12F are placed centrally in the front and rear of the vehicle 10, respectively. That is, the sensor pod 12E is mounted near the center of the front of the vehicle 10, while the sensor pod 12F is mounted near the center of the rear of the vehicle 10. The sensor pods 12E-12F may be mounted at the center, within manufacturing tolerances. Alternatively, if a part of the vehicle 10 blocks mounting of the sensor pods 12E-12F at the center, the sensor pods 12E-12F may be mounted adjacent the blocking part.

The field of view for the sensor pod 12E is illustrated via dotted lines 30, along with the lines 16 and 18 illustrating the field of view of sensor pods 12A and 12B, respectively, similar to FIG. 1. Thus, the area 20 in FIG. 2 may have triple overlapping coverage from the sensor pods 12A-12B and 12E. Additional areas 32 and 34 have overlapping coverage from the sensor pods 12A and 12E and the sensor pods 12B and 12E, respectively. Accordingly, a larger area of the overall field of view is overlapped among the sensors 12A-12B and 12E. Similarly, the area 26 at the rear of the vehicle 10 has triple overlapping coverage from the sensor pods 12C-12D and 12F, whose field of view is illustrated by dotted lines 36. Additional areas 38 and 40 have overlapping coverage from the sensors 12C and 12F and the sensors 12D and 12F, respectively.

It is noted that, while the embodiments of FIGS. 1 and 2 implement the same number of sensor pods in the front and rear of the vehicle, other embodiments may include more sensor pods in the front than in the rear (or vice versa). For example, the front may be more important to safety in many cases (since the vehicle is normally travelling forward), and thus including more sensor pods in the front may be desirable.

Figure 3:
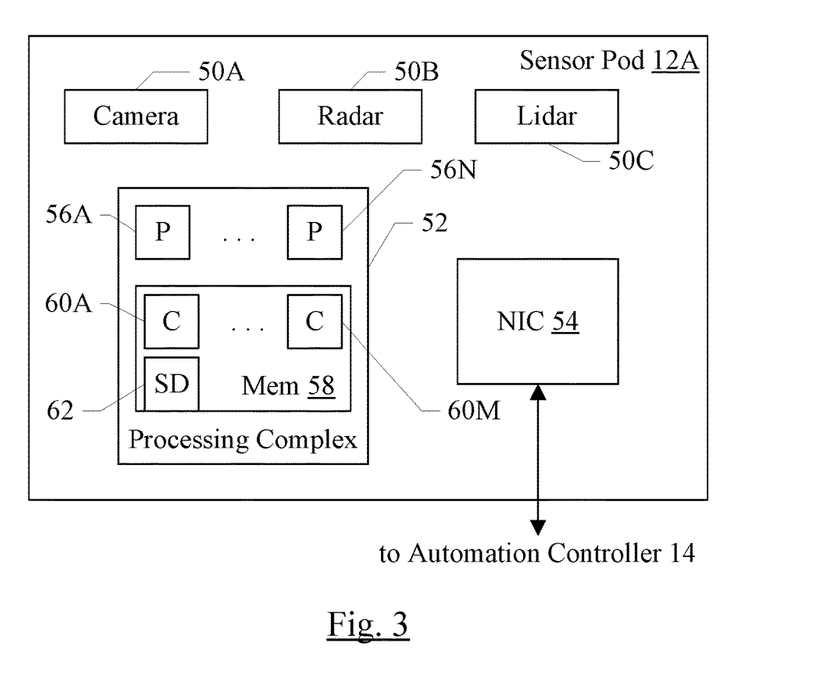
FIG. 3 is a block diagram of one embodiment of a sensor pod.

Turning now to FIG. 3, a block diagram of one embodiment of a sensor pod 12A is shown. Other sensor pods 12B-12F may be similar. In the illustrated embodiment, the sensor pod 12A includes a set of sensors 50A-50C, a processing complex 52, and a network interface controller (NIC) 54. The processing complex 52 may include multiple processors 56A-56N and a memory 58. The memory 58 may store multiple code sequences (e.g. threads, or programs) 60A-60M and sensor data 62 captured from the sensors 50A-50C.

As mentioned previously, a sensor pod may include multiple sensors having different modalities. A modality may refer to the manner in which a sensor senses the environment around the automation system. A modality may employ a particular sensing technology, e.g. observing various wavelengths of energy (passive sensing), or transmitting energy and observing its reflection (active sensing). The diversity of sensor modalities may improve the accuracy of the sensor pod, and may provide redundancy as well since multiple sensors are observing a similar field of view. If a sensor fails, other sensors may continue operation and thus the automation system may continue to detect objects in the field of view of the sensor pod. In other embodiments, a sensor pod may include at least one sensor and a processing complex that processes the sensor data into object data.

In the illustrated embodiment, the sensor pod 12A includes a camera sensor 50A, a radio detection and ranging (radar) sensor 50B, and a light detection and ranging (lidar) sensor 50C.

The camera sensor 50A may be any sort of sensor that captures a visible light image of the field of view. The camera sensor 50A output may be a set of pixels which indicate the color/intensity of light at that position within the frame (or picture) captured by the camera sensor 50A. A visible light camera sensor may be a passive sensor that captures visible light (electromagnetic waves in the visible light spectrum). Other types of cameras may capture other wavelengths of light (e.g. infrared cameras). The camera sensor 50A may be a passive sensor, if the sensed wavelengths is/are prevalent in the environment and reflected by objects in the environment (e.g. visible light) or are actively emitted by the object. The camera sensor 50A may also be an active sensor if the camera sensor 50A actively emits the light and observes any reflected light (e.g. infrared light).

The radar sensor 50B may be an active sensor that emits electromagnetic waves in the radio spectrum (radio waves) and/or microwave spectrum, and observes the reflection of the radio waves/microwaves to detect objects that reflect radio waves. Radar may be used to detect the range of an object (e.g. a position and distance), motion of the object, etc.

The lidar sensor 50C may be an active sensor that emits electromagnetic waves having wavelengths in the light spectrum (light waves) and observing the reflections of the emitted waves. For example, lidar sensors 50C may emit infrared wave pulses from lasers and detect reflected pulses. Other lidar sensors may use lasers that emit other wavelengths of light such as ultraviolet, visible light, near infrared, etc. Like radar, the lidar sensor 50C may be used to detect range, motion, etc.

Three sensors 50A-50C are shown in the embodiment of FIG. 3, although any number of one or more sensors may be implemented in a sensor pod 12A. Additionally, in some embodiments, different sensor pods 12A-12F may include different groups of sensors, as desired. Additional sensors beyond those shown in FIG. 3 may be used (e.g. ultrasonic, etc.) in addition to and/or as alternatives to the illustrated sensors.

The processing complex 52 may be coupled to the sensors 50A-50C and may be configured to capture the sensor data 62 from the sensors 50A-50C in the memory 58. The processing complex 52 may process the sensor data to identify objects in the physical area around the vehicle 10. Since the modalities of the sensors 50A-50C differ, the code sequences 60A-60M may include different code sequences to process the data from the different sensors 50A-50C. In some embodiments, different processing algorithms may be provided to process data from a given sensor 50A-50C. Different sensor pods 12A-12F may use different processing algorithms, providing diversity in the algorithms used. The code sequences 60A-60M may also include code that captures the data from the sensors 50A-50C. Alternatively, there may be direct memory access (DMA) hardware in the sensor pod 12A to transfer data from the sensors 50A-50C. As mentioned previously, the sensor data 62 may be processed to identify objects in the field of view, and the object data may be transmitted to the automation controller 14.

The processors 56A-56N may be provided in any fashion. For example, processors 56A-56N may be discrete processor integrated circuits which may be assembled, e.g., on a printed circuit board (PCB) with the memory 58. The processors 56A-56N may be multiple cores on a multicore processor integrated circuit. The processors 56A-56N may be central processing unit (CPU) processor cores on a system on a chip (SOC) integrated circuit or circuits. For example, in one embodiment, multiple SOCs may be included in the processing complex 52, providing redundancy in the SOCs in case of failure.

Figure 11:
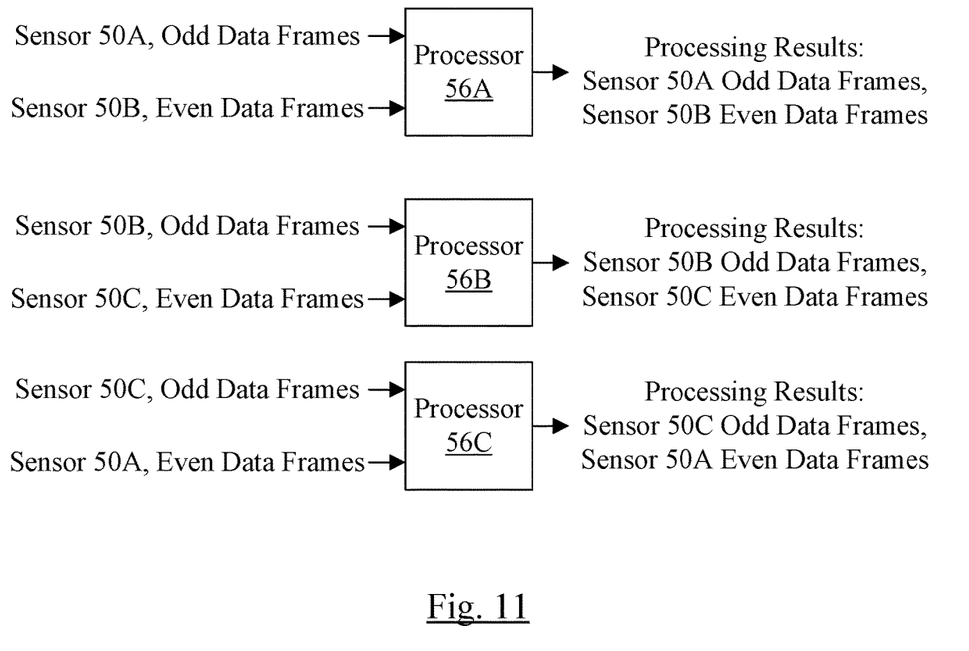
FIG. 11 is a block diagram illustrating one embodiment of processor diversification in a sensor pod.

In another embodiment, processors 56A-56N may be configured to process sensor data from sensors 50A-50C in a diversified manner, in order to tolerate failure in one of the processors. FIG. 11 shows an example where the data from sensor 50A is processed by processors 56A and 56C, the data from sensor 50B is processed by processors 56A and 56B, and the data from sensor 50C is processed by processors 56B and 56C. As shown, the processor 56A may output results from processing the odd data frames of sensor 50A and results from processing the even data frames of sensor 50B; the processor 56B may output results from processing the odd data frames of sensor 50B and results from processing the even data frames of sensor 50C; the processor 56C may output results from processing the odd data frames of sensor 50C and the even data frames of sensor 50A. Accordingly, the failure of one processor 56A-56C may result in the loss of half of the processed results from two sensors 50A-50C, but at least some data from each sensor 50A-50C may be processed.

The NIC 54 may provide network connectivity from the sensor pod 12A to the automation controller 14. Any network or point to point communication protocol may be used. In one embodiment, Ethernet is employed. In an embodiment, a high speed serial interface may be used, transported over coaxial cable or twisted pair wiring. In the illustrated embodiment, redundant NICs and/or redundant network cables are not used. The overlapping fields of view of the sensor pods 12A-12F may provide sufficient coverage for fail operational operation in the event of NIC failure or network cable failure. In other embodiments, redundant NICs and/or network cables may be provided.

In another embodiment, at least a portion of the processing performed by the processing complex 52 may be performed in the automation controller 14 for one or more sensor pods 12A-12D. In an embodiment, all of the processing for a given sensor pod 12A-12D may be performed in the automation controller 14 and the processing complex 52 need not be included in the corresponding sensor pod 12A-12D. In an embodiment, the processing complex 52 may not be included in any of the sensor pods 12A-12D.

Figure 4:
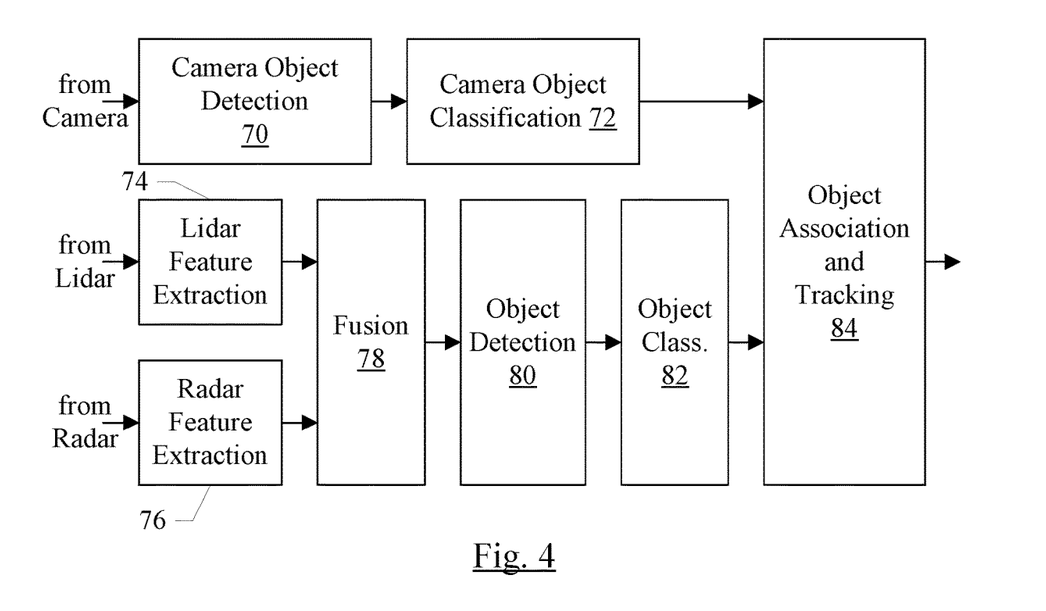
FIG. 4 is a block diagram illustrating processing of sensor data in the sensor pod, for one embodiment.

FIG. 4 is a block diagram illustrating one embodiment of processing sensor data in one of the sensor pods 12A-12F. Processing in other sensor pods 12B-12F may be similar. In an embodiment, the processing illustrated in FIG. 4 may be implemented in one or more of the code sequences 60A-60M stored in the memory 58 and executed by the processor(s) 56A-56N. That is, the code sequences 60A-

60M, when executed on the processors 56A-56N, cause the sensor pods to perform the operation shown in FIG. 4 and described below.

Data from the camera sensor 50A may be processed using deep neural networks 70 and 72. Neural network 70 may have been trained with camera images to detect various objects that may be observed on the roadways, such as other vehicles, traffic signals, traffic signs, traffic directions painted on the road, pedestrians, etc. The neural network 70 may receive the camera image data and may detect various objects in the image data. The resulting objects may be fed to the neural network 72, which may have been trained to classify the objects in various ways that may be useful to the automation controller 14. For example, moving (or movable) objects such as vehicles and pedestrians may be classified and stationary objects may be classified. Different types of vehicles may be classified. Front and rear views of vehicles may be classified (which may indicate direction of travel). Various traffic signs, signals, etc. may be classified. In another embodiment, the camera data may be fused with one or both of the radar data and the lidar data. The fused data may be input to the neural networks 70 and 72. In other embodiments fused and independent sensor data may be supplied to detection blocks. While neural network processing is used as an example for the camera data, any object detection and classification mechanisms may be used for any of the sensors and/or fused data from multiple sensors.

For the radar and lidar data, code sequences may process each data set to extract features from the data (feature extraction blocks 74 and 76). Generally, the features extracted may be data that indicates objects that are in the field of view, their distance away, and their direction of motion (if any). Data that are not features are data from noise at the frequencies of interest, background scatter, etc. Since both the lidar and radar sensors 50B-50C are sensing approximately the same field of view, the identified features from both sensors should be from the same objects. Accordingly, the processing may include a fusion of the features from the lidar sensor 50C and the radar sensor 50B (block 78). Features which aren't matched between the two sensors may be noise, and thus may be removed. The processing may include object detection 80 and object classification 82, similar to the discussion of blocks 70 and 72 above. However, in this embodiment, the object detection and classification 80 and 82 may not be implemented as neural networks. In other embodiments, one or both of the object detection and classification 80 and 82 may be neural networks trained over lidar and radar data indicating various objects that may be found in a roadway. The classification results from classification blocks 72 and 82 may be provided to an object association and tracking block 84, which may have data describing objects detected in the field of view from recently processed camera, radar, and lidar data. The object association and tracking block 84 may associate the objects detected in the camera, radar, and lidar data with previously detected objects (or identify the objects as newly detected). Thus, the block 84 may track the object's movements in the field of view.

It is noted that the sensor pods 12A-12F may not be continuously attempting to sense the environment around the vehicle 10. That is, the sensor pods 12A-12F may sample the environment, capturing snapshots of the objects at a sample rate. The sample rate may be high enough to permit high accuracy detection and tracking of nearby objects and high enough to support safe operation of the vehicle 10 in its environment. A sample rate in the tens of samples per second (Hz) may be sufficient, for example, although higher sample rates may be supported if the available bandwidth and processing power supports completion of processing of each data frame before or as the next data frame is being captured. A data frame, in this context, may refer to data corresponding to sensor data from one or more of the sensors in a sensor pod 12A-12F. The data in the data frame may be the raw sensor data, or may be data derived from the sensor data (e.g. a set of objects detected in the sensor data), or a combination of raw sensor data and the derived data.

Figure 5:
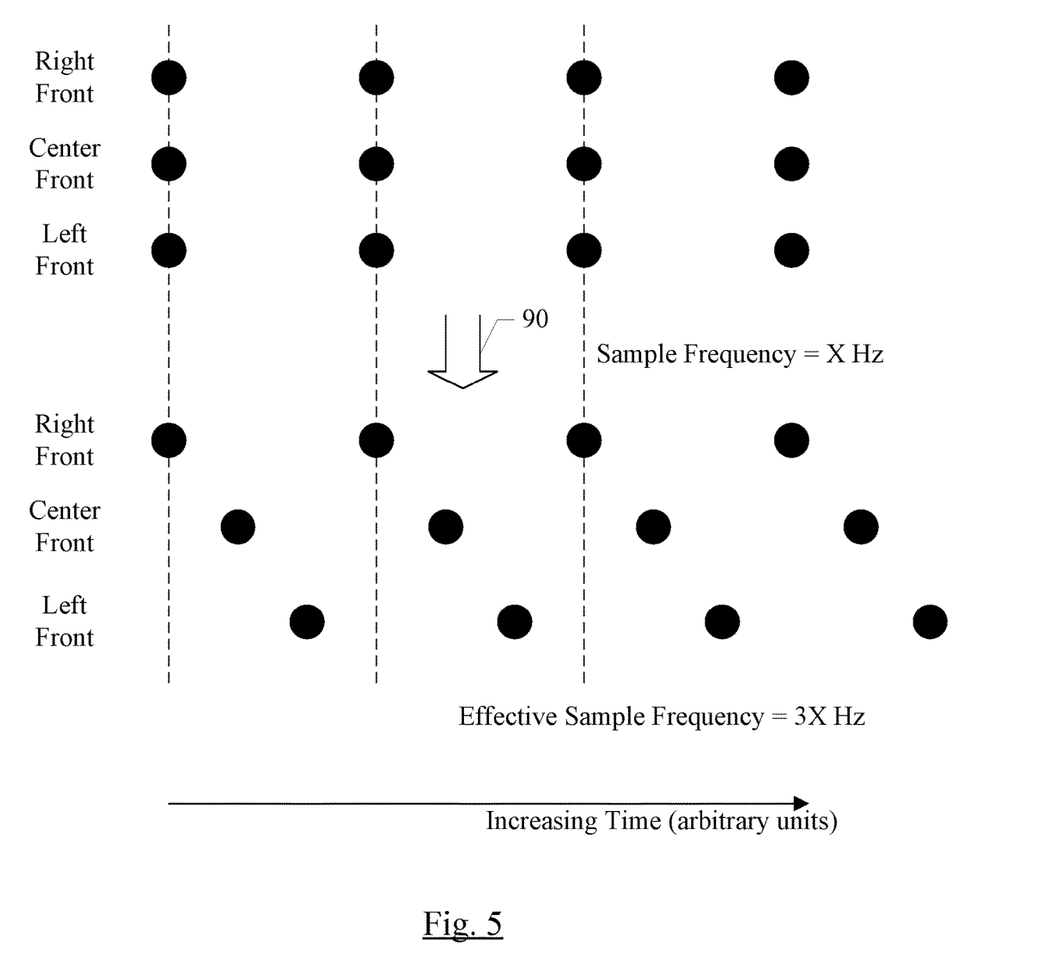
FIG. 5 is a block diagram of one embodiment of sensor data frame transfer to the automation controller.

Since the automation system includes multiple sensor pods with overlapping fields of view ("overlapping sensor pods" more briefly), the data frames may be correlated to each other, at least partially. That is, objects in the overlapping areas may be represented in the data frames from multiple sensor pods. The data frames may be synchronized in one way or another (e.g. a common clock source may be used for the pods, or there may be explicit synchronizations between the pods). FIG. 5 is a timing diagram illustrating sampling of data from overlapping sensor pods 12A-12F and the transmission of the objects identified in the data frames, for an embodiment.

FIG. 5 illustrates an example for sensor pods 12A-12B and 12E on the front of the vehicle 10 in FIG. 2. The sensor pods 12C-12D and 12F on the rear of the vehicle 10 may employ a similar scheme. Above the arrow 90 in FIG. 5 is one way to capture and transmit the data frames, in which each overlapping sensor pod captures a data frame at approximately the same time and transmits the data frame to the automation controller 14 at approximately the same time. Since the data frames are synchronized in time, the data frames may be directly compared for objects in the overlapping areas. On the other hand, the bandwidth on the network may exhibit significant spikes at the times the data frames are transferred, but almost no bandwidth between the data frames. The network may be designed to handle the spikes, which may increase cost. As shown in FIG. 5, the sample frequency may be X Hz, where X is based on the amount of time between data frames.

Below the arrow 90 in FIG. 5 is another way to transmit data frames, in which each overlapping sensor pod captures a data frame at a different point in time. For example, the right front sensor pod 12B may capture data frames at X Hz; the center front sensor pod 12E may capture data frames at X Hz but 120 degrees out of phase with the right front sensor pod 12B; and the left front sensor pod 12A may captures data frames at X Hz but 240 degrees out of phase with the right front sensor pod 12B and 120 degrees out of phase with the center front sensor pod 12E. The automation controller 14 may apply motion compensation to the data frames if comparison is desired. Also, the effective sample rate may increase since a data frame of the overlapping areas is being provided at a greater rate (e.g. 3X Hz in this example). The bandwidth spikes may also be reduced in magnitude since data frames are spread in time. Furthermore, staggering the data frames as shown below the arrow 90 may also provide diversity in time for the automation system. That is, data frames are taken at different times as other data frames. Other orders of data frames may be used as well.

The effective sample rate, in general, may be Y times the sample rate if all data frames are transmitted in synchronization, where Y is the number of overlapping sensor pods. For example, sensor pods 12A-12B and 12C-12D on the vehicle 10 in FIG. 1 may use a scheme in which data frames are transmitted at an effective sample frequency of 2× the synchronized sample rate (each overlapping sensor pod captures a data frame 180 degrees out of phase with the other). Larger numbers of overlapping sensor pods may be fewer degrees out of phase with each other. At some point as the number of overlapping sensor pods increase, some embodiments may lengthen the interval between successive data frames in the same sensor pod (e.g. decrease the X in X Hz).

Figure 6:
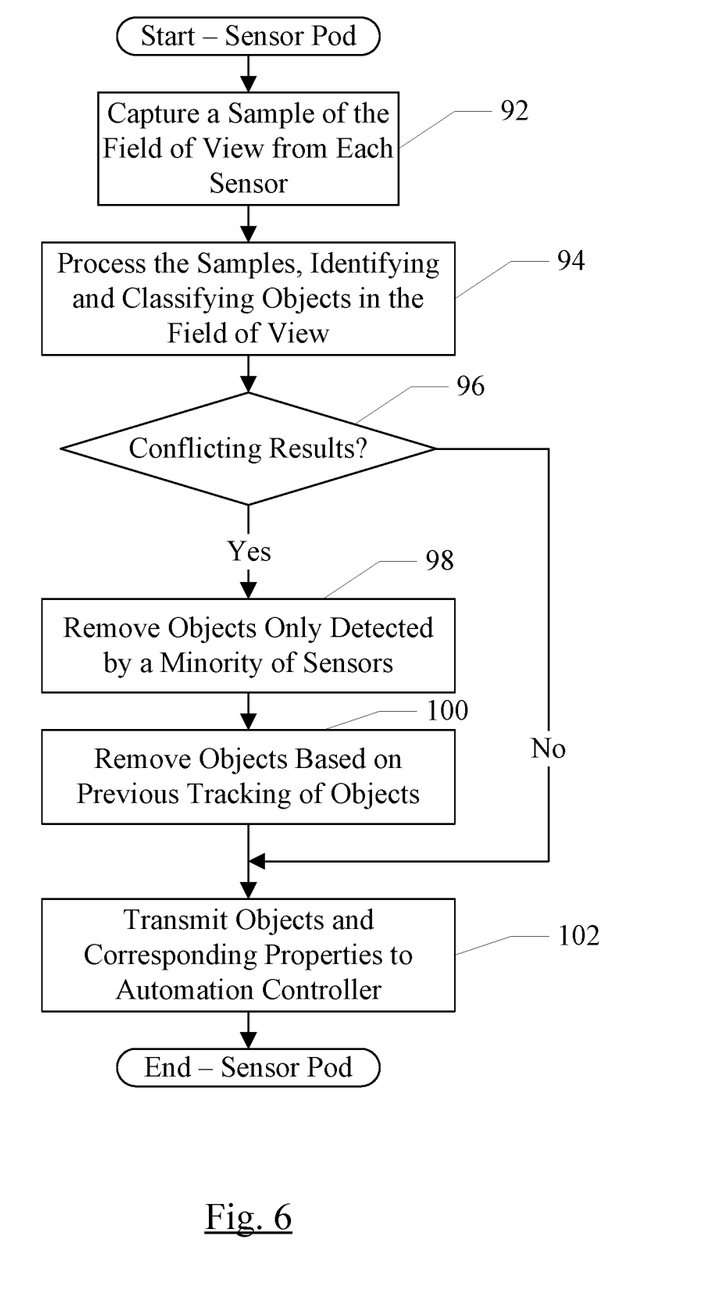
FIG. 6 is a flowchart illustrating operation of one embodiment of sensor pod processing at a high level.

FIG. 6 is a flowchart illustrating certain operations that may be implemented in the sensor pods 12A-12F, in an embodiment. One or more blocks in the flowchart may be implemented in hardware in the sensor pods 12A-12F, and/or one or more blocks may be implemented in software (e.g. code sequences 60A-60M) executed by the processors 56A-56N in the sensor pods 12A-12F. While the blocks are shown in a particular order for ease of understanding in FIG. 6, other orders may be used. Blocks may be implemented in parallel in combinatorial logic in the hardware and/or in different code sequences 60A-60M that may be executed in parallel on processors 56A-56N. Blocks, combinations of blocks, and/or the flowchart as a whole may be pipelined and/or serialized over multiple clock cycles. Thus, the sensor pods 12A-12F may be configured to implement the operation shown in FIG. 6, in hardware, in software, or in a combination thereof.

The sensor pod 12A-12F may capture a data frame of the field of view from each of the sensors 50A-50C that are included in the sensor pod 12A-12F (block 92). In an embodiment, the raw sensor data may be written to the memory 58 so that it is available for processing by the processors 56A-56N. The sensor pod 12A-12F may process the data frame, identifying objects in the field of view and classifying the objects (block 94). In an embodiment, one or more of the lidar data, the camera data, and radar data may be fused prior to object detection and classification.

The sensor pod 12A-12F may detect if there are conflicting results between the sensors (decision block 96). For example, during the fusion of the lidar and radar data, conflicting results may be detected. The conflicting results may be removed, or may be flagged as conflicting and the objects detected by the camera sensor may be used to determine which results to keep. Results may be conflicting if one sensor detects an object in the overlapping portion of the field of view and the other sensor does not detect it, or the other sensor detects something different. If there are conflicting results (decision block 96, "yes" leg), objects detected by a minority of the sensors 50A-50C may be viewed as inaccurate and the objects may be removed (block 98). Additionally, when associating objects with previously-detected objects (from previous data frames), e.g. block 84 in FIG. 4, objects may be removed based on the previous data frames. For example, an object that conflicts with (overlaps) a previously detected object that is still in the field of view may be removed (block 100). The sensor pod 12A-12F may transmit the remaining objects and corresponding properties to the automation controller 14 as the current data frame from the sensor pod 12A-12F (e.g. one of the black dots in FIG. 5) (block 102).

The properties that are sent with different objects may vary from embodiment to embodiment, and may depend on how much information the sensor pods 12A-12F detect and/or retain between data frames, from embodiment to embodiment. For example, the properties may include the classification of the object (vehicle, traffic sign or signal, obstruction, etc), movement (stationary or in motion, direction of motion, speed), etc.

Figure 7:
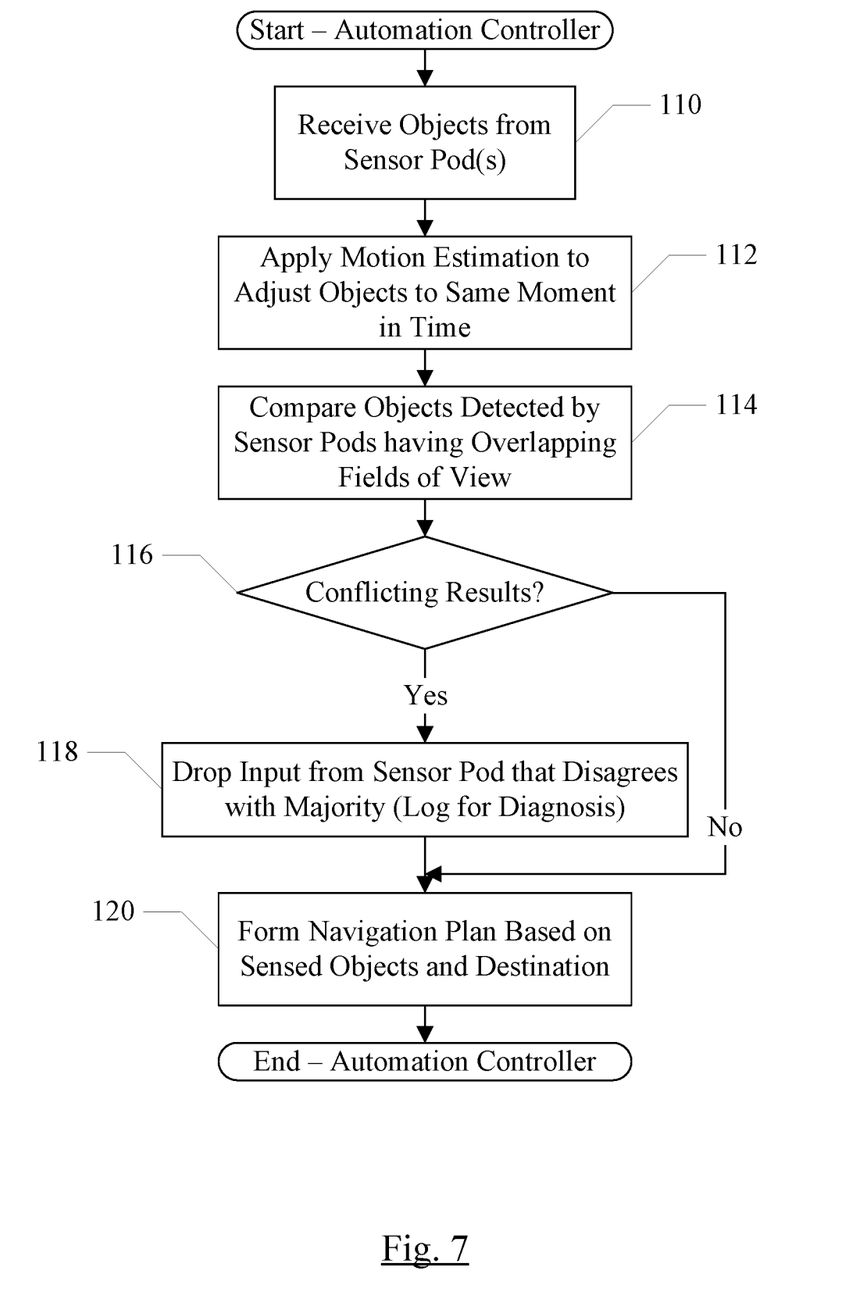
FIG. 7 is a flowchart illustrating operation of one embodiment of automation controller processing at a high level.

FIG. 7 is a flowchart illustrating certain operations that may be implemented in the automation controller 14, in an embodiment. One or more blocks in the flowchart may be implemented in hardware in the automation controller 14, and/or one or more blocks may be implemented in software (e.g. code sequences shown in FIG. 8 and described below) executed by the processors in the automation controller 14. While the blocks are shown in a particular order for ease of understanding in FIG. 7, other orders may be used. Blocks may be implemented in parallel in combinatorial logic in the hardware and/or in different code sequences that may be executed in parallel on different processors. Blocks, combinations of blocks, and/or the flowchart as a whole may be pipelined and/or serialized over multiple clock cycles. Thus, the automation controller may be configured to implement the operation shown in FIG. 7, in hardware, in software, or in a combination thereof.

The automation controller 14 may receive a set of one or more objects from a sensor pod or pods 12A-12F (block 110). In embodiments implementing that staggered transmission of objects from the overlapping sensor pods 12A-12F, the automation controller 14 may apply motion estimation on the objects within the overlapping field of view to shift the objects to approximately the same moment in time so that the objects may be compared (block 112). The automation controller 14 may compare the objects that are in the overlapping points of view (block 114). If there are conflicting results between the sensor pods (decision block 116, "yes" leg), the automation controller 14 may drop the input from the sensor pod that disagrees with the majority (block 118). The disagreement may be logged for diagnosis. That is, if one sensor pod is consistently being dropped as disagreeing with others, that sensor pod may be faulty or may have a faulty component. Intermittent disagreement may be caused by a variety of other factors. For example, if the sensor pod is temporarily obscured by mud, road grime, water being splashed on it from the ground, etc., the sensor pod may fail to detect one or more objects but may function properly again when not obscured. Based on the objects and tracking the objects over time, the automation controller may form a navigation plan to continue progress toward its destination safely in the environment that has been detected (block 120).

Figure 8:
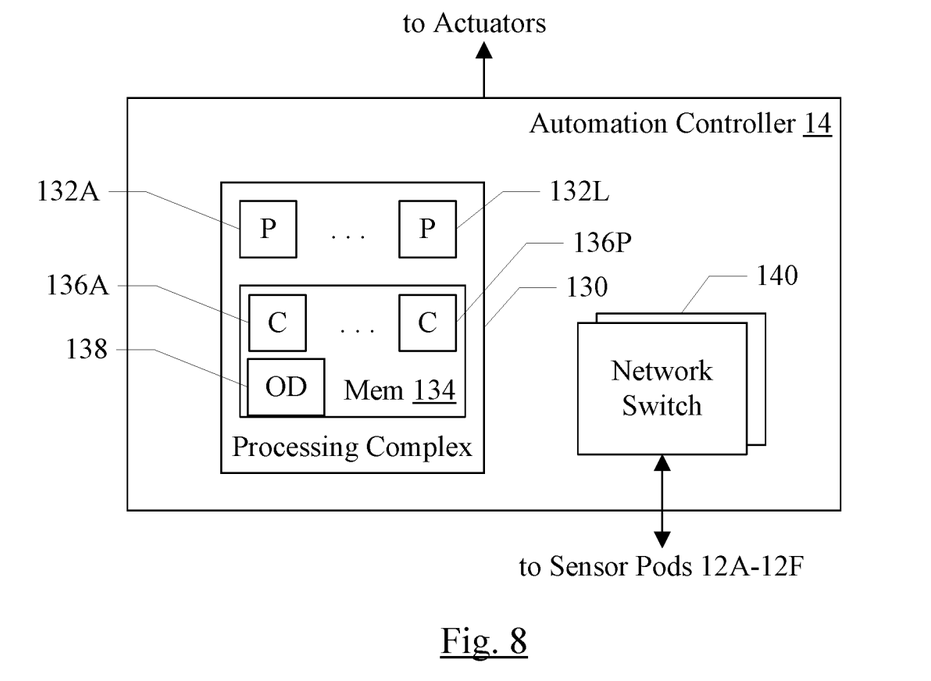
FIG. 8 is a block diagram of one embodiment of an automation controller.

FIG. 8 is a block diagram illustrating one embodiment of the automation controller 14. In the embodiment of FIG. 8, the automation controller 14 includes a processing complex 130 that includes processors 132A-132L and a memory 134. The memory 134 may store multiple code sequences 136A-136P as well as object data 138 identifying objects detected by the sensor pods 12A-12F. The automation controller 14 also includes redundant network switches 140 to couple to the sensor pods 12A-12N. The automation controller 14 may be coupled to various actuators as well (e.g. accelerator, brakes, steering, etc.) to control the vehicle 10. That is, the automation controller 14 may follow the navigation plan by controlling the actuators. Alternatively, the automation controller 14 may pass the navigation plan to a vehicle controller that controls the actuators. Redundant connections to the actuators may also be provided, in some embodiments.

Figure 12:
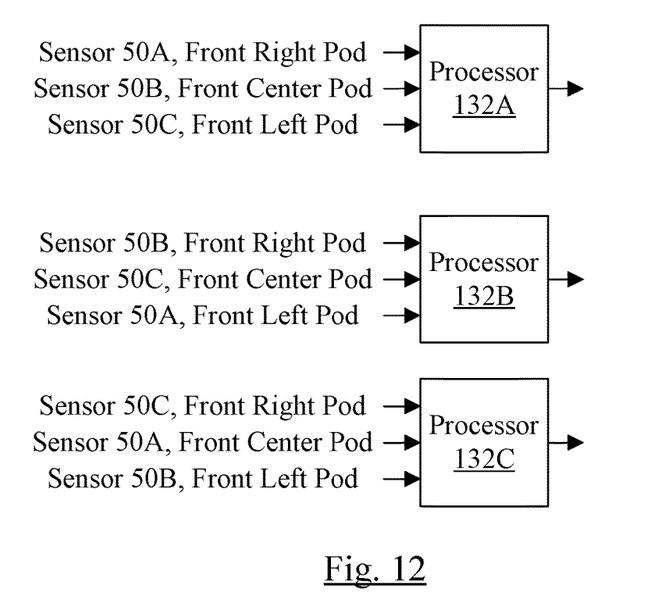
FIG. 12 is a block diagram illustrating one embodiment of processor diversification in an automation controller.

Processors 132A-132L may be configured to process object data 138 in a diversified manner in order to provide redundancy in the event of the failure of one processor. For example, FIG. 12 shows one embodiment where different sensor modalities from the same sensor pod are assigned to be processed by different processors. Processor 132A may be assigned to handle data from sensor 50A in the front right pod 12B, data from sensor 50B in the front center pod 12E, and data from sensor 50C in the front left pod 12A. Processors 132B and 132C may be assigned to handle data from sensors from different sensor pods as shown. Accordingly, the failure of one processor may result in the loss of data from one sensor modality in several sensor pods, but at least some modalities in these sensor pods are preserved.

Figure 9:
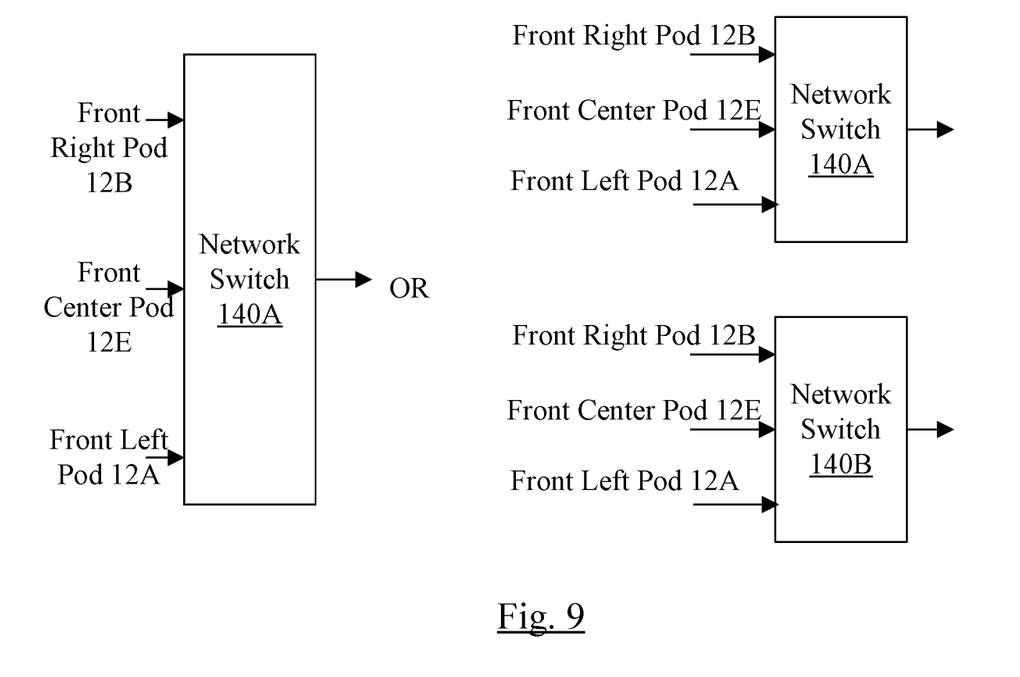
FIG. 9 is a block diagram of several exemplary embodiments of sensor network connections to network switches in the automation controller.

The network switches 140 provide redundancy in the connection to the sensor pods 12A-12N. A variety of connections may be used. For example, FIG. 9 illustrates certain embodiments of the connection for the front sensor pods 12A-12B and 12E. In one embodiment, shown on the left in FIG. 9, the front sensor pods 12A-12B and 12E are coupled to a network switch 140A. Accordingly, the failure of the network switch may result in loss of communication with the sensor pods 12A-12B and 12E. On the other hand, the redundant scheme to the left in FIG. 9 provides an additional path into the automation controller 14, and thus a failure of one of the two network switches 140A-140B would still allow the full data from the sensor pods 12A-12B and 12E to be received by the automation controller 14. In another embodiment, the sensor pods may be configured to transmit alternating even and odd data frames to the redundant network switches, so that the total network bandwidth is reduced (e.g. the total bandwidth may be the same as the non-redundant case shown on the right in FIG. 9). In an embodiment, the mapping of even and odd data frames from the sensor pods to the network switches 140A-140B may be set to increase the coverage and balance utilization. For example, the sensor pod 12A may send even data frames to network switch 140A and odd data frames to the network switch 140B, while the sensor pod 12B may send odd data frames to network switch 140A and even data frames to the network switch 140B. Accordingly, the failure of one network switch 140A-140B in the even/odd scheme may result in the loss of half of the data frames, but at least some data frames from each sensor pod may be received. While dual redundancy for the network switches 140 is illustrated in FIGS. 8 and 9, other embodiments may include further redundancy, as desired. The data sent by each sensor may be varied between the network switches in any desired fashion, such as round-robin.

The processing complex 130 may be similar to the processing complex 52 in FIG. 3, in terms of providing redundancy and fail operational operation for a processor 132A-132L or even an SOC (where multiple SOCs are included to provide the processors 132A-132L). The number of processors 132A-132L may differ from the number of processors 56A-56N depending on the relative amounts of computing resources employed for the sensor pod processing and the automation controller processing. The code sequences 136A-136P may implement the various processing operations of the automation controller 14, including the operation shown in FIG. 7.

Figure 10:
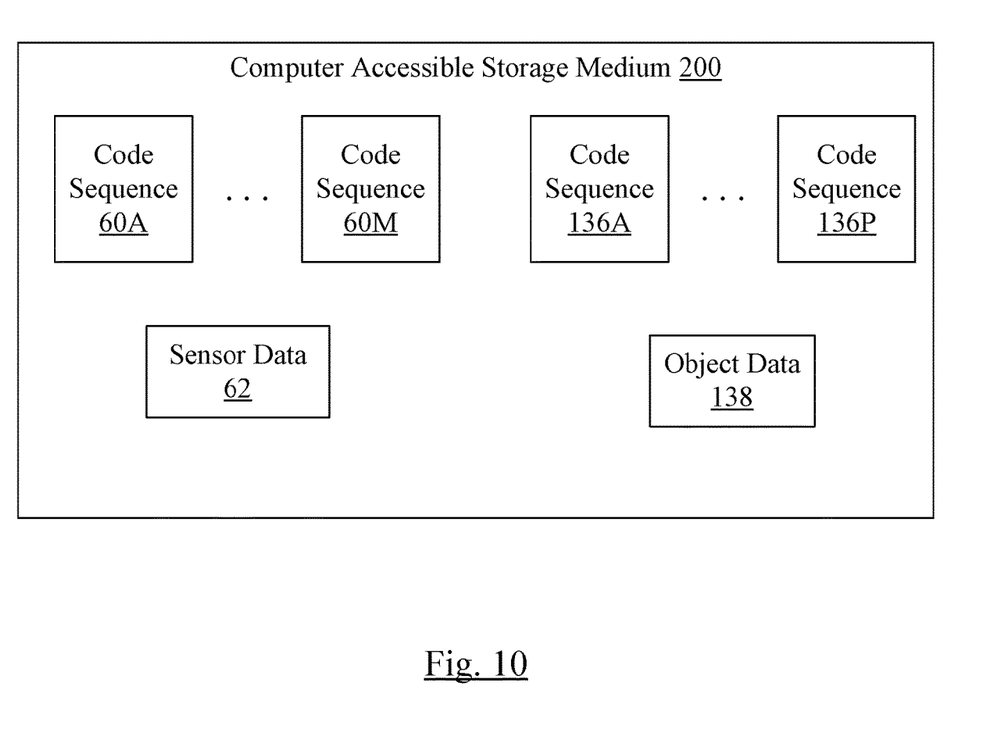
FIG. 10 is a block diagram of one embodiment of a computer accessible storage medium.

FIG. 10 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 10 may store code forming the code sequences 60A-60M and/or the code sequences 136A-136P. The computer accessible storage medium 200 may still further store one or more data structures such as the sensor data 62 and/or the object data 138. The code sequences 60A-60M and/or the code sequences 136A-136P may comprise instructions which, when executed, implement the operation described above for these components. A carrier medium may include computer accessible storage media as well as transmission media such as wired or wireless transmission.

Numerous variations and modifications will become apparent to those skilled in the art once the above disclosure is fully appreciated. It is intended that the following claims be interpreted to embrace all such variations and modifications.

What is claimed is:

1. An automation system comprising:
   at least one sensor pod, wherein the at least one sensor pod comprises at least one sensor, a local processing complex in the sensor pod, and a network interface controller, wherein the local processing complex comprises one or more processors and a memory, and wherein the local processing complex is configured to capture sensor data from the at least one sensor in the memory and is configured to process the sensor data in the at least one processor to generate object data that describes objects in a field of view of the at least one sensor;
   a communication network coupled to the network interface controller in the sensor pod, wherein the local processing complex is configured to transmit object data identifying the objects through the network interface controller and over the communication network; and
   an automation controller coupled to the communication network, wherein the automation controller is coupled to receive the object data from the at least one sensor pod over the communication network, and wherein the automation controller is configured to process the object data to generate navigation data describing a navigation path for a vehicle controlled by the automation system.

2. The automation system as recited in claim 1 wherein the at least one sensor comprises a plurality of sensors, wherein the plurality of sensors implement different modalities.

3. The automation system as recited in claim 1 further comprising at least one additional sensor pod coupled to the automation controller, wherein the field of view of the at least one additional sensor pod overlaps with the field of view of the at least one sensor pod.

4. The automation system as recited in claim 3 wherein the at least one additional sensor pod is configured to capture a data frame from at least one additional sensor in the at least one additional sensor pod and to transmit corresponding object data at a first time that is different from a second time at which the at least one sensor pod captures a data frame and transmits object data, wherein the at least one additional sensor and the at least one sensor capture data frames at a same sample rate but out of phase.

5. The automation system as recited in claim 1 wherein the at least one sensor comprises a plurality of sensors, wherein the local processing complex implements at least two different processing algorithms for subsets of the plurality of sensors.

6. The automation system as recited in claim 1 wherein different subsets of data frames from the at least one sensor are processed on different ones of the plurality of processors.

7. The automation system as recited in claim 1 wherein the at least one sensor pod comprises a plurality of sensor pods, and wherein data frames from each of the plurality of sensor pods are processed on two or more of a plurality of processors in the automation controller.

8. The automation system as recited in claim 1 wherein the at least one sensor pod comprises a plurality of sensor pods, wherein a first field of view of a first sensor pod of the plurality of sensor pods overlaps with a second field of view of a second sensor pod of the plurality of sensor pods; and the automation controller is configured to compare objects in an overlapping portion of the fields of view from the first sensor pod and the second sensor pod to confirm the objects.

9. The automation system as recited in claim 8 wherein the automation controller is configured to continue operation with the second sensor pod covering the overlapping portion responsive to a failure of the first sensor pod.

10. The automation system as recited in claim 1 wherein the at least one sensor pod comprises a plurality of sensor pods, wherein a first field of view of a first sensor pod of the plurality of sensor pods overlaps with a second field of view of a second sensor pod of the plurality of sensor pods, and wherein the first sensor pod is configured to transmit a first data frame of the first field of view at a first time and the second sensor pod is configured to transmit a second data frame of the second field of view at a second time that is offset from the first time; and the automation controller is configured to compare objects in an overlapping portion of the first field of view and the second field of view responsive to the first data frame and the second data frame.

11. The automation system as recited in claim 10 wherein the automation controller is configured to apply motion estimation to at least one of the first data frame and the second data frame prior to comparing objects in the first field of view and the second field of view.

12. The automation system as recited in claim 11 wherein the motion estimation is based on the offset.

13. The automation system as recited in claim 10 wherein in the event of failure of the first sensor pod, the automation controller is configured to continue operation using the second sensor pod.

14. A method comprising:
sensing data in a field of view in at least one sensor in at least one sensor pod, wherein the at least one sensor pod comprises a local processing complex that comprises one or more processors and a memory, and wherein the at least one sensor pod further comprises a network interface controller;
capturing sensor data from the at least one sensor in the memory;
processing the sensed data in the processors to identify objects in the field of view of the at least one sensor in a local processing complex within the sensor pod and to generate object data describing the objects in the field of view;
transmitting the object data from the local processing complex through the network controller and over a communication network to an automation controller;
receiving the object data from the at least one sensor pod in the automation controller over the communication network; and
processing the object data in the automation controller to produce navigation data describing a navigation path for a vehicle controlled by the automation controller.

15. The method as recited in claim 14 wherein the at least one sensor pod comprises a plurality of sensor pods, wherein a first field of view of a first sensor pod of the plurality of sensor pods overlaps with a second field of view of a second sensor pod of the plurality of sensor pods, the method further comprising comparing objects in an overlapping portion of the fields of view from the first sensor pod and the second sensor pod to confirm the objects in the automation controller.

16. An automation system comprising:
a plurality of sensor pods, wherein a first field of view of a first sensor pod of the plurality of sensor pods overlaps with a second field of view of a second sensor pod of the plurality of sensor pods, and wherein a given sensor pod of the plurality of sensor pods comprises at least one sensor, a local processing complex in the given sensor pod, and a network interface controller, and wherein the local processing complex comprises one or more processors and a memory, and wherein the local processing complex is configured to capture sensor data from the at least one sensor in the memory and is configured to process the sensor data in the at least one processor to generate object data that describes objects in a field of view of the at least one sensor;
a communication network coupled to the network interface controller in the given sensor pod, wherein the local processing complex is configured to transmit object data identifying the objects through the network interface controller and over the communication network; and
an automation controller coupled to the communication network, wherein the automation controller is coupled to receive the object data from the plurality of sensor pods over the communication network, and wherein the automation controller is configured to process the object data to generate navigation data describing a navigation path for a vehicle controlled by the automation system, and wherein the automation controller is configured to compare objects in an overlapping portion of the fields of view from the first sensor pod and the second sensor pod to confirm the objects.

17. The automation system as recited in claim 16 wherein the automation controller is configured to continue operation with the second sensor pod covering the overlapping portion responsive to a failure of the first sensor pod.

18. An automation system comprising:
a plurality of sensor pods, wherein a first field of view of a first sensor pod of the plurality of sensor pods overlaps with a second field of view of a second sensor pod of the plurality of sensor pods, and wherein the first sensor pod is configured to transmit a first data frame of the first field of view at a first time and the second sensor pod is configured to transmit a second data frame of the second field of view at a second time that is offset from the first time, wherein the first sensor pod and the second sensor pod capture data at approximately the same sample rate but out of phase by the offset; and an automation controller coupled to the plurality of sensor pods, wherein the automation controller is configured to adjust objects in the second data frame based on the offset and compare objects in an overlapping portion of the first field of view and the second field of view responsive to the first data frame and the adjusted second data frame.

19. The automation system as recited in claim 18 wherein the automation controller is configured to apply motion estimation to at least one of the first data frame and the second data frame prior to comparing objects in the first field of view and the second field of view.

20. The automation system as recited in claim 19 wherein the motion estimation is based on the offset.

21. The automation system as recited in claim 18 wherein in the event of failure of the first sensor pod, the automation controller is configured to continue operation using the second sensor pod.

* * * * *